US012579211B2

(12) United States Patent
Panikkar

(10) Patent No.: US 12,579,211 B2
(45) Date of Patent: Mar. 17, 2026

(54) AUTOMATED SHIFTING OF WEB PAGES BETWEEN DIFFERENT USER DEVICES

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 364 days.

(21) Appl. No.: 17/573,760

(22) Filed: Jan. 12, 2022

(65) Prior Publication Data

US 2023/0222169 A1    Jul. 13, 2023

(51) Int. Cl.
*G06F 16/955* (2019.01)
*G06F 16/9538* (2019.01)

(52) U.S. Cl.
CPC ...... *G06F 16/9554* (2019.01); *G06F 16/9538* (2019.01); *G06F 16/9566* (2019.01)

(58) Field of Classification Search
CPC ............. G06F 16/9554; G06F 16/9566; G06F 16/9538
USPC ........................................................ 707/706
See application file for complete search history.

(56) References Cited

U.S. PATENT DOCUMENTS

| | | | | |
|---|---|---|---|---|
| 6,900,905 B2 * | 5/2005 | Simpson | ................. | G06F 3/122 |
| | | | | 358/1.18 |
| 6,944,868 B2 * | 9/2005 | Simpson | ............. | G06F 16/9577 |
| | | | | 709/200 |
| 7,006,243 B2 * | 2/2006 | Simpson | ............... | G06F 3/1206 |
| | | | | 358/1.18 |
| 7,062,752 B2 * | 6/2006 | Simpson | ................. | H04L 67/02 |
| | | | | 707/999.009 |

(Continued)

FOREIGN PATENT DOCUMENTS

| | | | | | |
|---|---|---|---|---|---|
| CN | 102103669 A | * | 6/2011 | ............. | G06F 21/31 |
| EP | 2575058 A1 | * | 4/2013 | ......... | G06F 16/9554 |

(Continued)

OTHER PUBLICATIONS

A. Stein, "Revamp Landing Page Design With QR Codes," https://www.qr-code-generator.com/blog/landing-page-design-with-qr-codes/, Mar. 18, 2020, 13 pages.

(Continued)

*Primary Examiner* — Tony Mahmoudi
*Assistant Examiner* — Michael Le
(74) *Attorney, Agent, or Firm* — Ryan, Mason & Lewis, LLP

(57) ABSTRACT

An apparatus in an illustrative embodiment comprises at least one processing device that includes a processor coupled to a memory, with the at least one processing device being configured to obtain at least a portion of a uniform resource locator (URL) presented in a browser, to determine at least one of a domain and one or more cookies associated (Continued)

100 with the URL, to generate a file comprising information characterizing the at least one of the domain and the one or more cookies associated with the URL, to generate a multi-dimensional code based at least in part on the generated file, and to present the multi-dimensional code via the browser for scanning. The multi-dimensional code in some embodiments is presented for scanning by a mobile application of a mobile device of a user.

17 Claims, 12 Drawing Sheets

(56)                    References Cited

U.S. PATENT DOCUMENTS

| | | | | |
|---|---|---|---|---|
| 7,073,131 | B2 * | 7/2006 | Simpson | G06F 16/986 |
| | | | | 707/E17.118 |
| 7,106,469 | B2 * | 9/2006 | Simpson | G06K 15/1836 |
| | | | | 358/1.18 |
| 7,191,448 | B2 * | 3/2007 | Simpson | G06F 16/958 |
| | | | | 358/1.18 |
| 8,145,710 | B2 * | 3/2012 | Cowings | G06Q 10/107 |
| | | | | 709/205 |
| 8,296,477 | B1 * | 10/2012 | Polk | G06Q 99/00 |
| | | | | 710/16 |
| 9,288,198 | B2 * | 3/2016 | DeSoto | G06Q 20/3276 |
| 9,646,101 | B1 * | 5/2017 | Wu | G06K 19/06037 |
| 10,311,120 | B2 * | 6/2019 | Cai | G06F 16/954 |
| 11,335,327 | B2 * | 5/2022 | Rafferty | G06F 40/279 |
| 2005/0262136 | A1 * | 11/2005 | Lloyd | G06F 11/3495 |
| 2012/0198531 | A1 * | 8/2012 | Ort | H04W 12/06 |
| | | | | 709/227 |
| 2012/0278465 | A1 * | 11/2012 | Johnson | G06Q 30/02 |
| | | | | 709/223 |
| 2013/0151496 | A1 * | 6/2013 | Jacobs | G06F 16/954 |
| | | | | 707/706 |
| 2013/0166918 | A1 * | 6/2013 | Shahbazi | H04L 9/0863 |
| | | | | 713/183 |
| 2013/0219479 | A1 * | 8/2013 | DeSoto | H04L 63/08 |
| | | | | 726/6 |
| 2013/0278622 | A1 * | 10/2013 | Sun | G06Q 20/3274 |
| | | | | 345/589 |
| 2014/0278789 | A1 * | 9/2014 | Singh | G06Q 30/0203 |
| | | | | 705/7.32 |
| 2014/0282924 | A1 * | 9/2014 | Singhal | H04L 63/0853 |
| | | | | 726/5 |
| 2014/0365778 | A1 * | 12/2014 | Wang | G06F 21/45 |
| | | | | 713/175 |
| 2015/0102100 | A1 * | 4/2015 | Hattrup | G06Q 30/02 |
| | | | | 53/64 |
| 2015/0348329 | A1 * | 12/2015 | Carre | H04N 21/42202 |
| | | | | 345/633 |
| 2016/0042032 | A1 * | 2/2016 | Rosati | H04L 9/3247 |
| | | | | 235/375 |
| 2016/0323107 | A1 * | 11/2016 | Bhogal | H04W 12/10 |
| 2016/0323108 | A1 * | 11/2016 | Bhogal | H04W 12/08 |
| 2017/0094514 | A1 * | 3/2017 | Kelts | H04W 12/08 |
| 2018/0232817 | A1 * | 8/2018 | Isaacson | G06F 3/048 |
| 2019/0007381 | A1 * | 1/2019 | Isaacson | G06Q 20/12 |
| 2019/0026122 | A1 | 1/2019 | Wang et al. | |
| 2019/0230070 | A1 * | 7/2019 | Isaacson | H04W 12/084 |
| 2019/0230165 | A1 | 7/2019 | Wang et al. | |
| 2019/0306137 | A1 * | 10/2019 | Isaacson | H04W 12/08 |
| 2019/0386981 | A1 * | 12/2019 | Ramesh Kumar | H04L 9/3228 |
| 2020/0226617 | A1 * | 7/2020 | Meadow | G06K 19/06037 |
| 2020/0251088 | A1 * | 8/2020 | Collins | H04L 9/3226 |
| 2021/0112072 | A1 * | 4/2021 | Kratzer | G06F 16/9566 |
| 2021/0192003 | A1 * | 6/2021 | Kargaran | G06F 16/9554 |
| 2022/0012795 | A1 * | 1/2022 | Vannoni | G06Q 30/0633 |
| 2022/0182388 | A1 * | 6/2022 | Boodaei | H04L 63/0861 |

FOREIGN PATENT DOCUMENTS

| | | | | | |
|---|---|---|---|---|---|
| EP | | 3182302 | A1 * | 6/2017 | G06F 16/955 |
| WO | WO-2017036059 | A1 * | 3/2017 | | G06K 19/06037 |

OTHER PUBLICATIONS

A. Alapetite, "Dynamic 2D-barcodes for Multi-device Web Session Migration Including Mobile Phones," Personal and Ubiquitous Computing, vol. 14, No. 1, Apr. 2, 2009, 13 pages.

H. Song et al., "Browser Session Preservation and Migration," WWW Conference, May 7-11, 2002, 2 pages.

Apple Inc. "Use Handoff to Continue Tasks on your other Devices," https://support.apple.com/en-us/HT209455, Accessed Dec. 14, 2021, 3 pages.

* cited by examiner

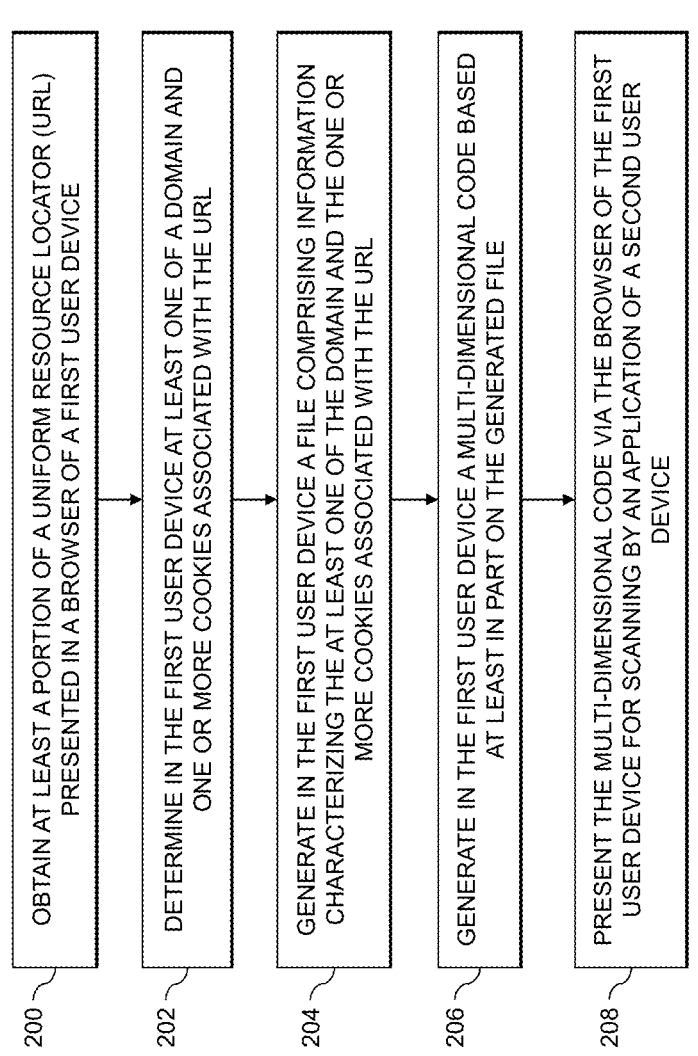

200 — OBTAIN AT LEAST A PORTION OF A UNIFORM RESOURCE LOCATOR (URL) PRESENTED IN A BROWSER OF A FIRST USER DEVICE

202 — DETERMINE IN THE FIRST USER DEVICE AT LEAST ONE OF A DOMAIN AND ONE OR MORE COOKIES ASSOCIATED WITH THE URL

204 — GENERATE IN THE FIRST USER DEVICE A FILE COMPRISING INFORMATION CHARACTERIZING THE AT LEAST ONE OF THE DOMAIN AND THE ONE OR MORE COOKIES ASSOCIATED WITH THE URL

206 — GENERATE IN THE FIRST USER DEVICE A MULTI-DIMENSIONAL CODE BASED AT LEAST IN PART ON THE GENERATED FILE

208 — PRESENT THE MULTI-DIMENSIONAL CODE VIA THE BROWSER OF THE FIRST USER DEVICE FOR SCANNING BY AN APPLICATION OF A SECOND USER DEVICE

FIG. 2

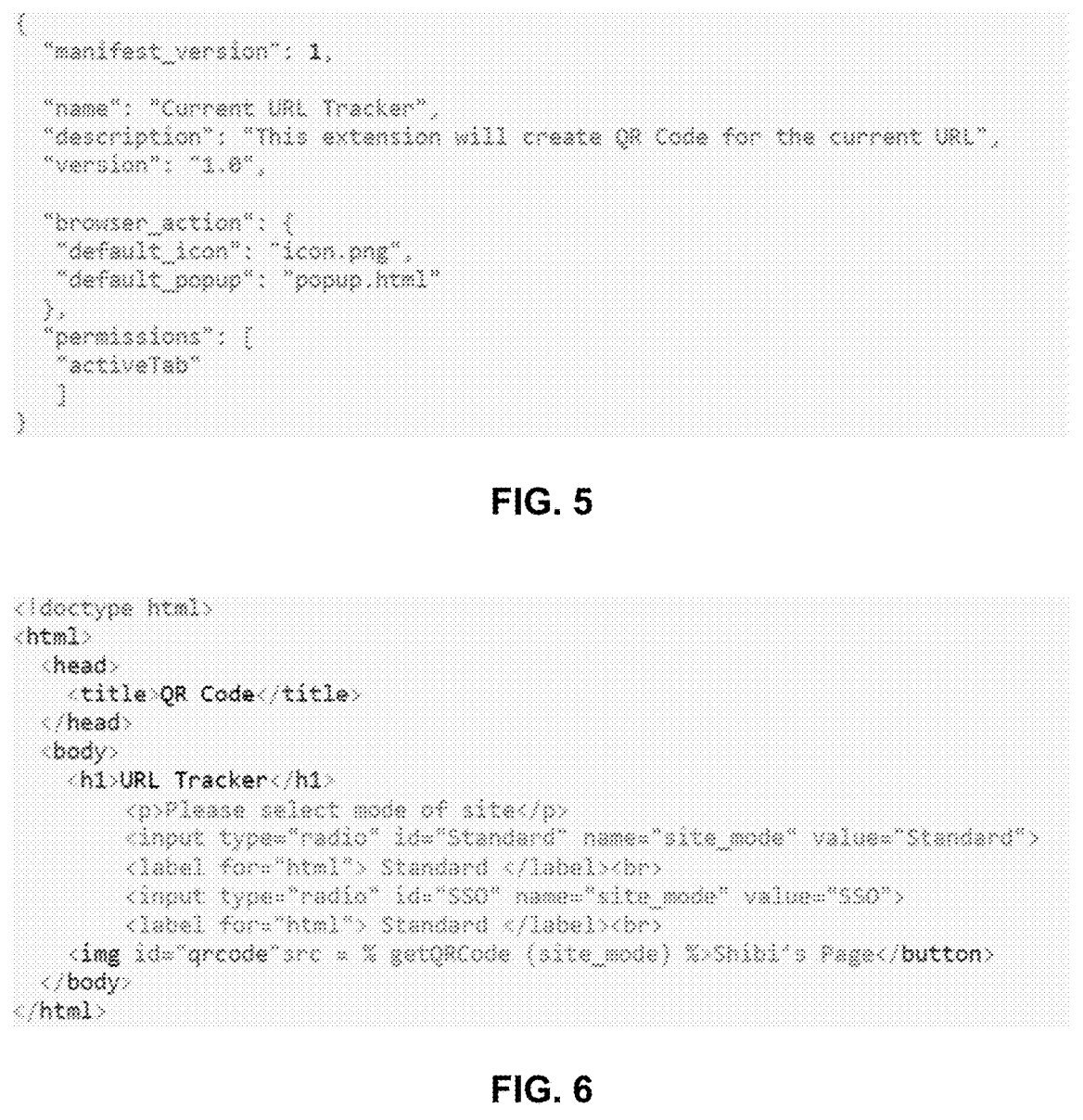

```
{
    "manifest_version": 1,

"name": "Current URL Tracker",
    "description": "This extension will create QR Code for the current URL",
    "version": "1.0", "browser_action": {
        "default_icon": "icon.png",
        "default_popup": "popup.html"
    },
    "permissions": [
        "activeTab"
    ]
}
```

FIG. 5

```
<!doctype html>
<html>
    <head>
        <title>QR Code</title>
    </head>
    <body>
        <h1>URL Tracker</h1>
        <p>Please select mode of site</p>
        <input type="radio" id="Standard" name="site_mode" value="Standard">
        <label for="html"> Standard </label><br>
        <input type="radio" id="SSO" name="site_mode" value="SSO">
        <label for="html"> Standard </label><br>
        <img id="qrcode" src = $ getQRCode (site_mode) $>Shibli's Page</button>
    </body>
</html>
```

```
{
  "currentURL":"https://www.dell.com/en-in?mn=DReCpgoFSs5sTuK_JQ1lQN0_aE0f6c9E5h-AJbnavXAV6f3gi9",
  "MyCookie":{
    "domain":"console.delltechnologies.com",{
      "cookievalues":{
        "cookie_key":"cookie_value"
      }
    }
  }
}
```

FIG. 8A

```
{
  "currentURL":"<encrypted current URL>",
  "MyCookie":{
    "domain":"<encrypted domain>",{
      "cookievalues":{
        "cookie_key":"<encrypted cookie values>"
      }
    }
  }
}
```

FIG. 8B

```
<html>
<head>
<title>Meta Tags Example</title>
<meta name = "keywords" content = "HTML, Meta Tags, Metadata">
<QRDetails>
    <IQR Details Goes Here>
</QRDetails>
</meta>
</head>
<body>
<p>This is the Product Page</p>
</body>
</html>
```

FIG. 9

```
<QRDetails>
  <product id = "$productId" name = "$productName" description="$prodDesc">
  <options>
    <option value = "View Video Demo" >
      <visualDemo url = "https://dell.com/$product/visualDemo.mp4"/>
    </option>
    <option value = "View Detailed Product" >
      <productDetails resturl = "https://dell.com/product/additionalprodcuts?product = $prodcut"/>
    </option>
    <option value = "View Related Product" >
      <relatedproducts resturl = "https://dell.com/product/realtedProdcuts?product = $prodcut"/>
    </option>
    <option value = "View Pubic Rating" >
      <rating resturl = "https://dell.com/product/rating?product = $productId"/>
    </option>
  </options>
  </product>
  <cookies>
    <currentURL value = "https://www.dell.com/en-in?mm=DReOpqoFSs5sTuKjQ1lQN0_aE0fk6c9E5h-AJlbnavXAV6f3gl9"/>
    <myCookie>
      <domain>console.delltechnologies.com</domain>
      <cookievalues>
        <cookie key = "$key" value = "$value"/>
        <cookie key = "$key" value = "$value"/>
      </cookievalues>
    </myCookie>
  </cookies>
</QRDetails>
```

FIG. 10

```xml
<QRDetails>
  <product description="Dell Inspiron 3501 Intel 11th Gen i5-1135G7 15 inches FHD Business Laptop" name="Inspiron 3500" id="11113451">
    <options>
      <option value="View Video Demo">
        <visualDemo url="https://dell.com/$product/$product/visualDemo.mp4"/>
      </option>
      <option value="View Detailed Product">
        <productDetails resturl="https://dell.com/product/additionalproducts?product=11113451"/>
      </option>
      <option value="View Related Product">
        <relatedproducts resturl="https://dell.com/product/realtedProducts?product=11113451"/>
      </option>
      <option value="View Public Rating">
        <relatedproducts resturl="https://dell.com/product/rating?product=11113451"/>
      </option>
    </options>
  </product>
  <cookies>
    <currentURL value="https://www.dell.com/en-in?mn=ORcCpqoFSz&sTuK_JQ1IQN0_aE0Hkc9lESb-AJIbnavXAV6i3gi9"/>
    <myCookie>
      <domain>console.delltechnologies.com</domain>
      <cookievalues>
        <cookie value="value" key="name"/>
        <cookie value="value1" key="name1"/>
      </cookievalues>
    </myCookie>
  </cookies>
</QRDetails>
```

FIG. 11

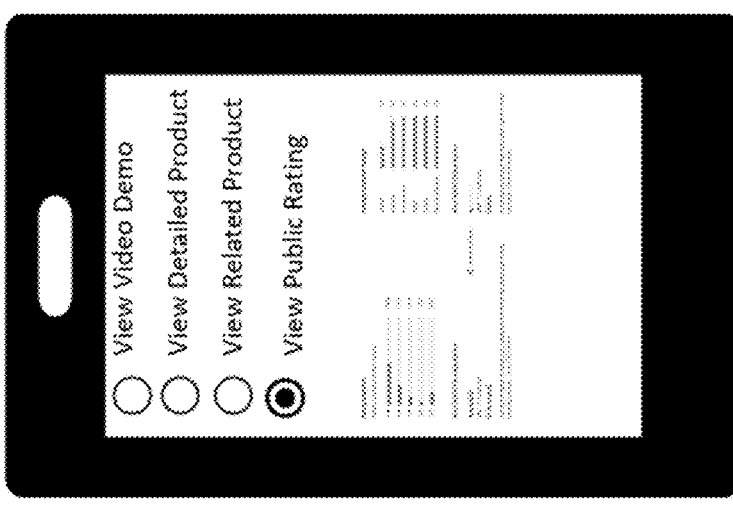
FIG. 12C
FIG. 12B
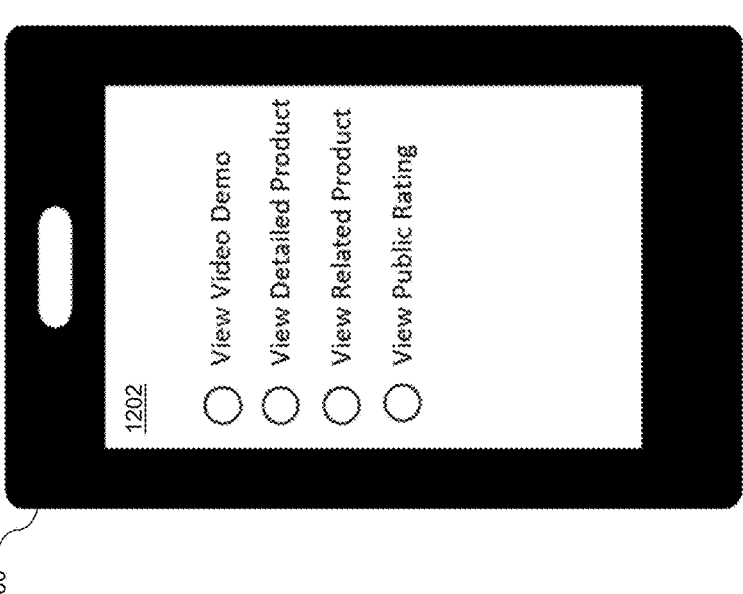
FIG. 12A

AUTOMATED SHIFTING OF WEB PAGES BETWEEN DIFFERENT USER DEVICES

COPYRIGHT NOTICE

FIELD

The field relates generally to controlling access to information resources, and more particularly to techniques for providing access to web pages at multiple user devices in an information processing system.

BACKGROUND

It is common for users to access different websites for different purposes like shopping, researching, working, training, etc. There are many scenarios in which a user, through interaction with a website utilizing a browser on a desktop or laptop computer, has reached a particular web page of the website, and then needs to relocate and would like to view the same web page on a different device, such as a mobile phone or tablet. A conventional approach is for the user to type the uniform resource locator (URL) of the current web page into a browser on the mobile phone or tablet, while viewing that URL on the desktop or laptop. However, manually typing an entire URL into the browser of a new device can be very difficult. For example, if the user is in the midst of interacting with the website, having navigated through multiple distinct web pages and having entered various types of information into one or more of the web pages, the URL will often be highly complex and effectively non-readable, with session identifiers, redirections, query strings, and other elements. Manually typing such a complex URL into a browser of a mobile phone or tablet is highly impractical and prone to error.

SUMMARY

Illustrative embodiments of the present disclosure provide techniques for automated shifting of web pages between different user devices. For example, some embodiments provide a quick response (QR) code based solution allowing the state of a given website in a browser of one device to be easily shifted from that device to another device, thereby avoiding the difficulties with the conventional approaches described above.

In one embodiment, an apparatus includes at least one processing device comprising a processor coupled to a memory. The at least one processing device is configured to obtain at least a portion of a URL presented in a browser, to determine at least one of a domain and one or more cookies associated with the URL, to generate a file comprising information characterizing the at least one of the domain and the one or more cookies associated with the URL, to generate a multi-dimensional code based at least in part on the generated file, and to present the multi-dimensional code via the browser for scanning.

Generating the file in some embodiments illustratively comprises generating at least one file in a JavaScript Object Notation (JSON) format that incorporates information characterizing the domain and the one or more cookies associated with the URL. Additional or alternative file formats can be used.

In some embodiments, the multi-dimensional code comprises a two-dimensional QR code, although it is to be appreciated that the disclosed techniques can be implemented using other types of multi-dimensional codes.

The obtaining, determining, generating a file, generating a multi-dimensional code and presenting the multi-dimensional code are performed in some embodiments at least in part by a plug-in of the browser, although other embodiments can be implemented without the use of a browser plug-in.

In some embodiments utilizing a browser plug-in, the browser plug-in is implemented on a first user device and the multi-dimensional code presented via the browser for scanning is presented for scanning by a second user device different than the first user device.

For example, the multi-dimensional code in some embodiments is presented for scanning by a mobile application of a mobile device of a user.

In some embodiments, the at least one processing device is further configured to determine a website type for the URL from a plurality of distinct website types including at least a standard website type for a non-authenticated website and a single sign-on (SSO) enabled website type for an authenticated website. Such a determination of a website type for the URL in some embodiments is illustratively performed based at least in part on user input, and in other embodiments is performed automatically without requiring user input.

Responsive to determining that the website type for the URL is a standard website type for a non-authenticated website, the at least one processing device determines the domain associated with the URL and generates the file based at least in part on the determined domain.

Responsive to determining that the website type for the URL is an SSO enabled website type for an authenticated website, the at least one processing device determines the domain and one or more cookies associated with the URL, and generates the file based at least in part on the domain and the one or more cookies associated with the URL.

In some embodiments, a mobile application used to scan the multi-dimensional code presented via the browser is more particularly configured to read the multi-dimensional code, and to determine a website type for the URL from a plurality of distinct website types including at least a standard website type for a non-authenticated website and an SSO enabled website type for an authenticated website. Responsive to the website type being a standard website type for a non-authenticated website, the mobile application opens the URL in a browser of the mobile device.

Responsive to the website type being an SSO enabled website type for an authenticated website, the mobile application sets the one or more cookies associated with the URL in the browser of the mobile device, and opens the URL in the browser of the mobile device.

In some embodiments, generating a multi-dimensional code based at least in part on the generated file comprises generating the multi-dimensional code to include web page metadata defining one or more options for accessing additional information relating to a web page identified by the URL.

These and other illustrative embodiments include, without limitation, systems, apparatus, methods and computer program products comprising processor-readable storage media.

BRIEF DESCRIPTION OF THE DRAWINGS

FIG. 2 is a flow diagram of an example process for automated shifting of web pages between user devices in an illustrative embodiment.

FIGS. 5 through 8 show examples of software code utilized in implementing automated shifting of web pages between user devices in illustrative embodiments. FIG. 8 includes two separate figures denoted FIGS. 8A and 8B, collectively referred to herein as FIG. 8.

FIGS. 9, 10 and 11 show examples of software code utilized in generating a QR code that includes web page metadata defining multiple options for accessing additional information relating to a web page identified by a URL in illustrative embodiments.

FIGS. 12A, 12B and 12C show different example screenshots of a display of a mobile device presenting multiple options based on web page metadata extracted from a QR code in an illustrative embodiment. These figures are collectively referred to herein as FIG. 12.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
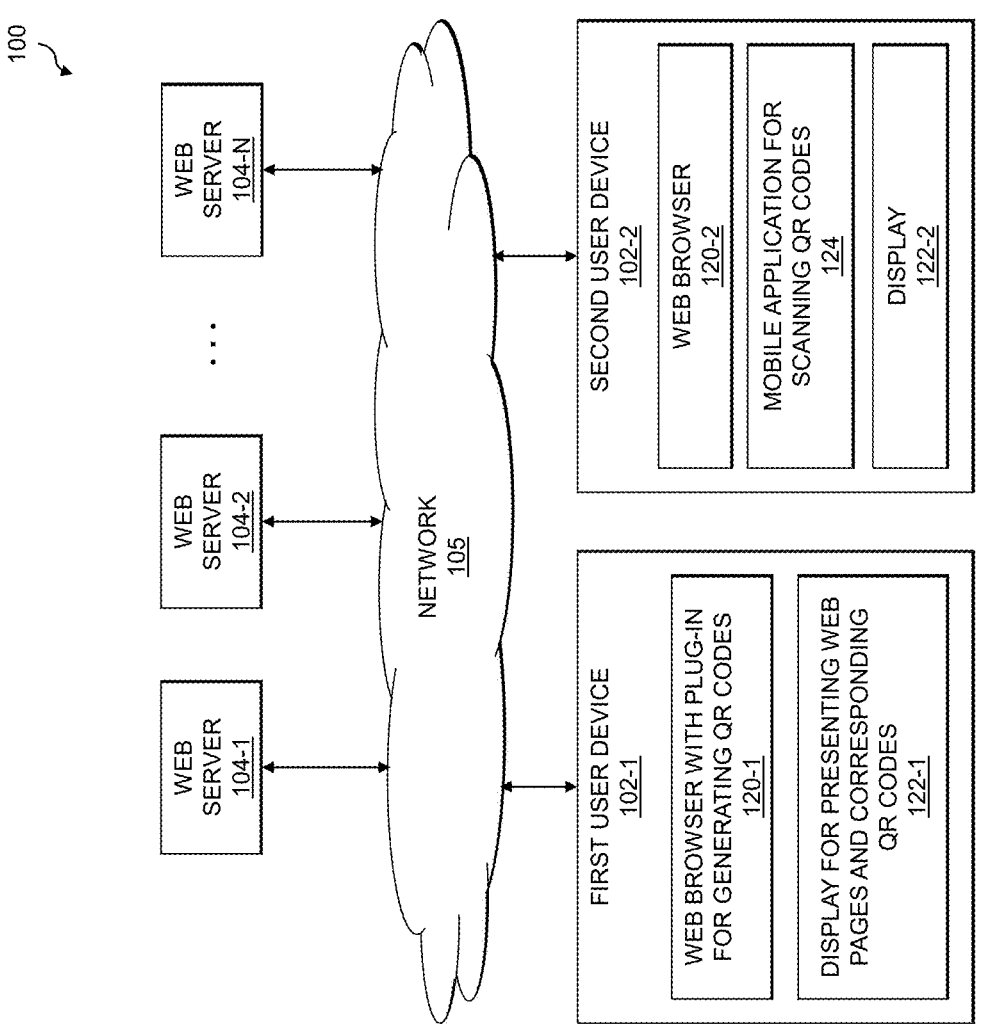
FIG. 1 is a block diagram of an information processing system configured with functionality for automated shifting of web pages between user devices in an illustrative embodiment.

FIG. 1 shows an information processing system 100 configured in accordance with an illustrative embodiment. The information processing system 100 comprises first and second user devices 102-1 and 102-2, each of which is configured to communicate with a plurality of web servers 104-1, 104-2, . . . 104-N over a network 105. The user devices 102-1 and 102-2 are collectively referred to herein as user devices 102, and the web servers 104-1, 104-2, . . . 104-N are collectively referred to herein as web servers 104. Additional components may be included in the system 100, but are not explicitly shown in FIG. 1, such as, for example, one or more authentication servers.

At least a portion of the web servers 104 and one or more additional components such as an authentication server may be implemented at least in part using cloud-based virtualization infrastructure such as a virtual machine or container.

A given one of the user devices 102 may comprise, for example, a desktop computer, a laptop computer, a tablet computer, a mobile telephone or another type of device from which a user accesses one or more of the web servers 104 via a browser of a corresponding one of the user devices 102. Such devices are examples of what are more generally referred to herein as "processing devices."

The first user device 102-1 comprises a web browser 120-1 that includes a plug-in for generating QR codes in the manner disclosed herein. The first user device 102-1 further comprises a display 122-1 for presenting web pages retrieved from one or more of the web servers 104 and corresponding QR codes generated for respective ones of those web pages. Such QR codes are considered examples of what are more generally referred to herein as "multi-dimensional codes." Accordingly, illustrative embodiments herein are not limited to use with QR codes, but can additionally or alternatively utilize other types of multi-dimensional codes.

The web browser 120-1 can comprise an otherwise conventional browser such as a Google Chrome browser, a Mozilla Firefox browser or a Microsoft Internet Explorer browser, suitably modified to incorporate a plug-in for generating QR codes in the manner disclosed herein. Other embodiments can generate QR codes or other types of multi-dimensional codes without using a browser plug-in.

For example, the web browser 120-1 can be configured to directly generate such QR codes without utilizing a plug-in. Similarly, QR code generation functionality as disclosed herein can in some embodiments be implemented at least in part external to the web browser 120-1, utilizing other components of the first user device 102-1.

The first user device 102-1 also includes a display 122-1 for presenting web pages retrieved from one or more of the web servers 104 and corresponding QR codes generated by the plug-in of the web browser 120-1. The first user device 102-1 also illustratively comprises additional components of a type commonly found in such a user device, although such components are not explicitly shown in FIG. 1.

The second user device 102-2 comprises a web browser 120-2 and a display 122-2. These components may be similar to the corresponding components of the first user device 102-1, but need not include a browser plug-in or other related functionality for generating QR codes and presenting those QR codes on display 122-2.

It is assumed in some embodiments that the first user device 102-1 comprises a desktop computer or a laptop computer, and the second user device 102-2 comprises a mobile device such as a mobile telephone or a tablet computer. Such devices are illustratively both associated with or otherwise accessible to a particular user of the system 100. The second user device 102-2 further comprises an application, illustratively implemented as a mobile application 124, for scanning QR codes generated by the plug-in of the web browser 120-1 of the first user device 102-1 and presented on the display 122-1 of the first user device 102-1.

As will be described in more detail below, such an arrangement supports automated shifting of web pages from the first user device 102-1 to the second user device 102-2, without requiring a user to manually enter a URL from a URL bar of the web browser 120-1 of the first user device 102-1 into the web browser 120-2 of the second user device 102-2. The term "automated shifting" as used herein is intended to be broadly construed, so as to encompass a wide variety of different arrangements that utilize automated processing, such as generation and display of QR codes for respective web pages, to facilitate moving access of a given web page between multiple user devices. This illustratively includes numerous arrangements that are implemented with some user involvement, but with automation utilized to facilitate various aspects of the shifting process.

In some embodiments, interactions between the web browsers 120 of the user devices 102 and the web servers 104 result in the storage of "cookies" by the web browsers 120. The term "cookie" as used herein is intended to be broadly construed, so as to comprise various types of information stored in a browser or elsewhere in a user device in conjunction with access to one or more websites.

Additionally or alternatively, some embodiments may require that a user authentication protocol be carried out between a given one of the user devices 102 and an authentication server in conjunction with obtaining access to one or more of the web servers 104. For example, a given such user authentication protocol may comprise a Challenge-Handshake Authentication Protocol (CHAP) or another type of challenge-based authentication protocol, in which the user device receives a challenge from the authentication server, and responds by sending a hash of at least a portion of the challenge and a user password. Other types of user authentication protocols can be used in other embodiments.

It is to be appreciated that a wide variety of other types and arrangements of user devices 102 and web servers 104 and associated protocols may be used in other embodiments. Also, the term "user" in this context and elsewhere herein is intended to be broadly construed so as to encompass, for example, human, hardware, software or firmware entities, as well as various combinations of such entities.

The network 105 is assumed to comprise a portion of a global computer network such as the Internet, although other types of networks can be part of the information processing system 100, including a wide area network (WAN), a local area network (LAN), a satellite network, a telephone or cable network, a cellular network such as a 4G or 5G cellular network, a wireless network such as a WiFi, WiMAX or Bluetooth network, or various portions or combinations of these and other types of networks. The network 105 of information processing system 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In the present embodiment, the user devices 102 are configured to communicate over the network 105 with the web servers 104. Each of the user devices 102 is assumed to be implemented using a corresponding processing device comprising at least one processor coupled to at least one memory. The web servers 104 in the FIG. 1 embodiment are each also assumed to be implemented using at least one processing device comprising at least one processor and one or more associated memories.

A given such processor illustratively comprises a microprocessor, a central processing unit (CPU), a graphics processing unit (GPU), a microcontroller, an application-specific integrated circuit (ASIC), a field-programmable gate array (FPGA) or other type of processing circuitry, as well as portions or combinations of such circuitry elements.

A given such memory illustratively comprises random access memory (RAM), read-only memory (ROM), flash memory or other types of memory, in any combination. The memory and other memories disclosed herein may be viewed as examples of what are more generally referred to as "processor-readable storage media" storing executable computer program code or other types of software programs.

Articles of manufacture comprising such processor-readable storage media are considered embodiments of the present disclosure. A given such article of manufacture may comprise, for example, an integrated circuit containing memory, a storage system comprising a storage disk or a storage array, as well as a wide variety of other types of computer program products. The term "article of manufacture" as used herein should be understood to exclude transitory, propagating signals.

The above-noted processing devices each further comprise one or more network interfaces configured to allow the processing device to communicate over the network 105 with other processing devices of the system 100. Such a network interface illustratively comprises one or more transceivers.

It is to be appreciated that the particular arrangement of components of the FIG. 1 embodiment is presented by way of example only, and alternative arrangements can be used in other embodiments.

An illustrative embodiment of an example process for automated shifting of web pages between user devices 102 in the information processing system 100 will now be described in more detail with reference to the flow diagram of FIG. 2.

In this embodiment, it is assumed that a user associated with the first user device 102-1 is viewing a web page via the web browser 120-1 and the display 122-1, where the first user device 102-1 comprises a desktop or laptop computer, and desires to access the same web page from a different user device of a different type, in this case the second user device 102-2, which illustratively comprises a mobile telephone or a tablet computer, each illustratively referred to herein as a mobile device.

The process as illustrated includes steps 200 through 208, which are assumed to be performed primarily by the first user device 102-1, illustratively utilizing the plug-in of web browser 120-1 to generate QR codes for respective web pages for presentation on display 122-1. It is to be understood that this particular process is only an example, and additional or alternative processes can be carried out in other embodiments. For example, in other embodiments, a browser plug-in is not used, and the QR code generation functionality is implemented directly within the software code of the web browser itself.

In step 200, at least a portion of a URL presented in the web browser 120-1 of the first user device 102-1 is obtained, illustratively by the plug-in. For example, in some embodiments, obtaining at least a portion of the URL presented in the web browser 120-1 comprises reading at least a portion of the URL from a URL bar of the web browser 120-1, although the information can be obtained in other ways in other embodiments. The URL identifies a particular web page which is obtained from one of the web servers 104 and is being viewed on the display 122-1 of the first user device 102-1 via the web browser 120-1.

In step 202, a determination is made of at least one of a domain and one or more cookies associated with the URL. As described in more detail below, the particular information determined in this step will illustratively vary depending upon the particular type of website identified by the URL. For example, in some embodiments, only a domain of the URL is determined, while in other embodiments, both a domain and one or more cookies are determined. Additional or alternative types of information can be determined in other embodiments. The term "domain" as used herein is intended to be broadly construed so as to encompass, for example, information extracted from at least a portion of a URL as obtained in step 200. A "domain" as that term is broadly used herein can additionally or alternatively comprise, for example, a portion of a URL itself, or the entire URL itself.

In step 204, a file is generated comprising information characterizing at least one of the domain and the one or more cookies associated with the URL. For example, generating the file can comprise generating the file in a JavaScript Object Notation (JSON) format that incorporates information characterizing the domain and the one or more cookies associated with the URL, although additional or alternative file formats can be used.

In some embodiments, the first user device 102-1 is configured to determine a website type for the URL from a plurality of distinct website types including at least a standard website type for a non-authenticated website and a single sign-on (SSO) enabled website type for an authenticated website. Such a determination can be made as part of step 202, with or without user input. For example, a user can be presented with a list of website types to select from within the web browser 120-1. Additionally or alternatively, the determination of a website type for the URL can be performed automatically without requiring user input.

The file can be generated in different ways in step 204 based at least in part on the website type determined in step 202 the manner described above.

For example, responsive to determining that the website type for the URL is a standard website type for a non-authenticated website, step 202 determines the domain associated with the URL and step 204 generates the file based at least in part on the determined domain, without utilizing cookies.

As another example, responsive to determining that the website type for the URL is an SSO enabled website type for an authenticated website, step 202 determines the domain and one or more cookies associated with the URL, and step 204 generates the file based at least in part on the domain and the one or more cookies associated with the URL.

In step 206, a QR code or other type of multi-dimensional code is generated based at least in part on the generated file from step 204. The QR code is an example of a multi-dimensional code having two dimensions. Examples of such a QR code generated in a web browser can be seen in FIGS. 3 and 4 to be described below.

In step 208, the QR code or other multi-dimensional code is presented via the web browser 120-1 on the display 122-1 for scanning by the mobile application 124 on the second user device 102-2.

Such an arrangement advantageously allows the web page corresponding to the QR code or other multi-dimensional code presented in step 208 to be shifted in an automated manner from the first user device 102-1 to the second user device 102-2 without requiring manual entry of any portion of the URL into the web browser 120-2 of the second user device 102-2.

For example, the mobile application 124 of the second user device 102-2 is illustratively configured to read the QR code scanned from the display 122-1 of the first user device 102-1, and to determine a website type for the URL from a plurality of distinct website types including at least a standard website type for a non-authenticated website and an SSO enabled website type for an authenticated website.

Responsive to the website type being a standard website type for a non-authenticated website, the mobile application 124 opens the URL in the web browser 120-2 of the second user device 102-2, which as indicated previously is illustratively a mobile device such as a mobile telephone or a tablet computer.

Responsive to the website type being an SSO enabled website type for an authenticated website, the mobile application 124 sets the one or more cookies associated with the URL in the web browser 120-2 of the second user device 102-2, and opens the URL in the web browser 120-2 of the second user device 102-2.

Additional or alternative functionality can be implemented in the mobile application 124 to allow the second user device 102-2 to display a web page that is shifted in an automated manner from the first user device 102-1.

The particular processing operations and other system functionality described in conjunction with the flow diagram of FIG. 2 are presented by way of illustrative example only, and should not be construed as limiting the scope of the present disclosure in any way. Alternative embodiments can use other types of processing operations to implement automated shifting of web pages between user devices. For example, certain steps may be performed at least in part concurrently with one another rather than serially. As additional examples, one or more of the process steps may be repeated periodically for different web pages or different user devices, and multiple such processing instances can be performed in parallel with one another to provide automated shifting of web pages for different web pages or different user devices within a given information processing system.

Also, functionality such as that described in conjunction with the flow diagram of FIG. 2 can be implemented at least in part in the form of one or more software programs stored in program code of a memory of first user device 102-1 and executed by a processor of the first user device 102-1. As mentioned previously, a storage device or other memory having executable program code of one or more software programs embodied therein is an example of what is more generally referred to herein as a "processor-readable storage medium." The foregoing example process is therefore illustrative only, and should not be viewed as limiting the scope of any particular embodiment in any way. Those skilled in the art will appreciate that numerous alternative automated web page shifting arrangements can be used in other embodiments.

Additional illustrative embodiments will now be described with reference to FIGS. 3 through 12.

Figure 3:
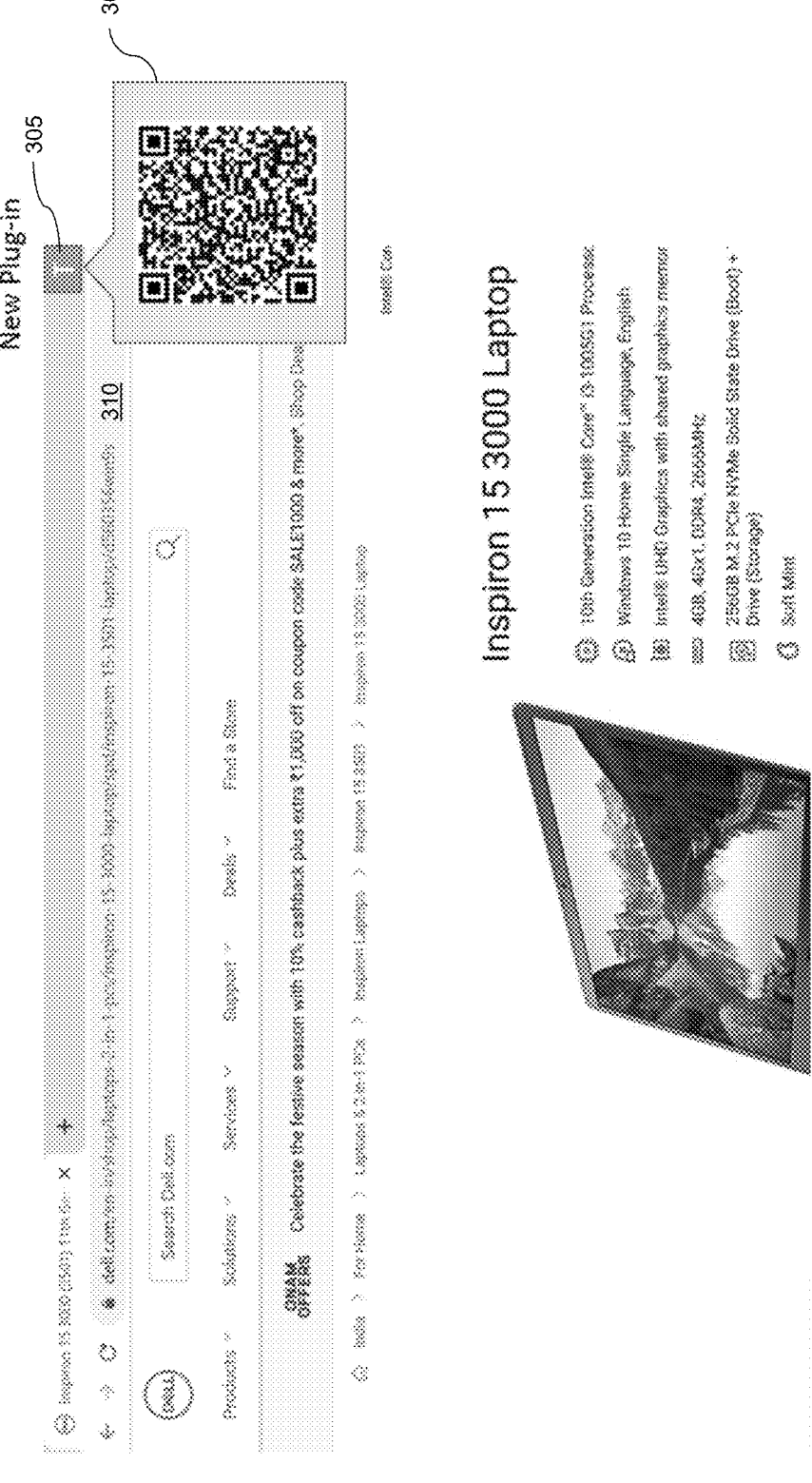
FIG. 3 illustrates generation of a QR code characterizing a URL of a website using a browser plug-in in an illustrative embodiment.

Referring initially to FIG. 3, a screenshot 300 of an example web page presented via web browser 120-1 on display 122-1 of the first user device 102-1 is shown. The example web page in this embodiment is presented with a corresponding QR code 302 generated by a new plug-in 305 of the type disclosed herein. The QR code 302 illustratively encodes information characterizing a domain and possibly one or more cookies associated with a corresponding URL presented on a URL bar 310 of the web browser 120-1. This is an example of an arrangement in which a QR code characterizing a URL of a website is generated using a browser plug-in in an illustrative embodiment.

Figure 4:
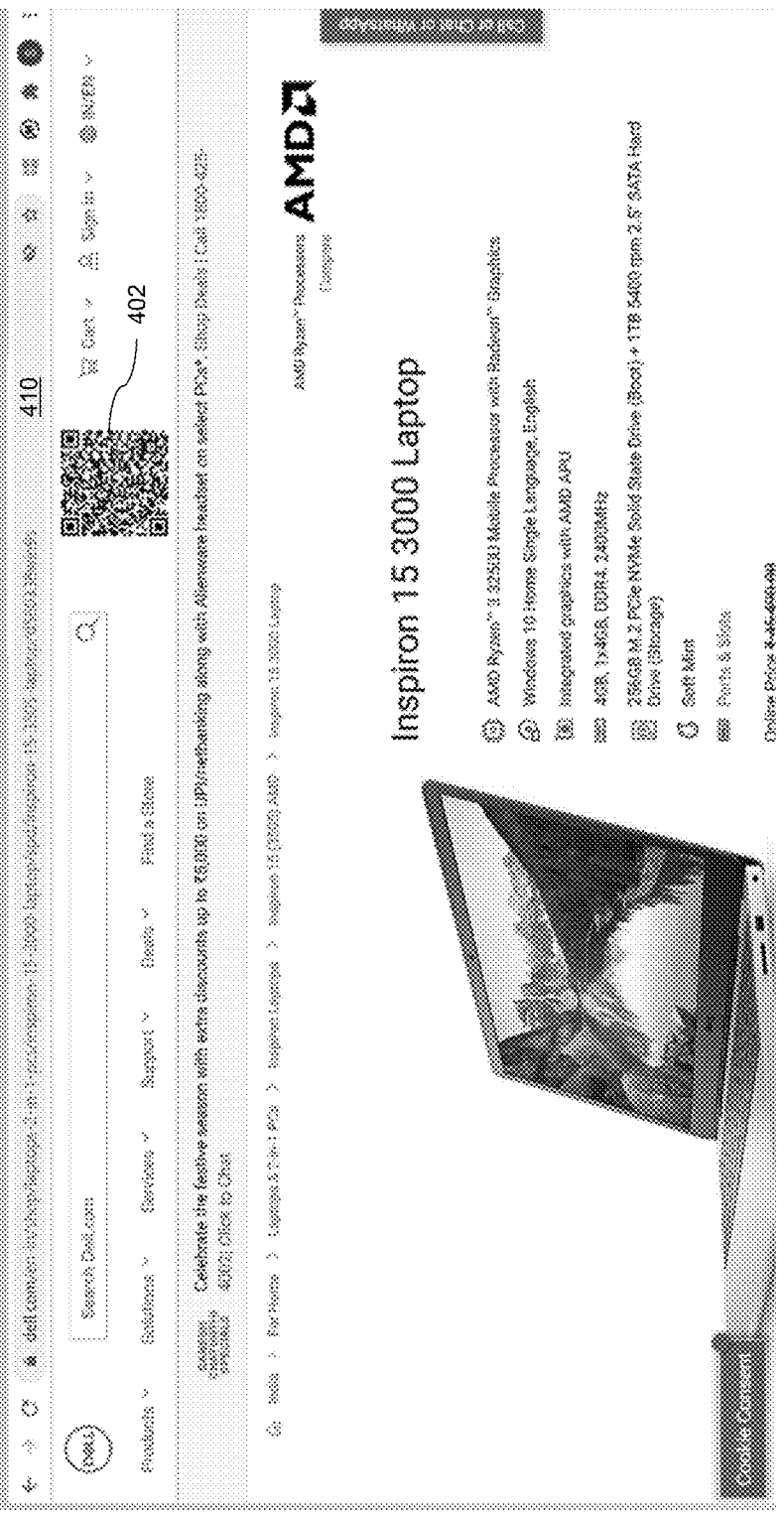
FIG. 4 illustrates generation of a QR code characterizing a URL of a website directly in a browser without using a browser plug-in in an illustrative embodiment.

FIG. 4 shows a screenshot 400 of another example web page presented via web browser 120-1 on display 122-1 of the first user device 102-1. The example web page in this embodiment is presented with a corresponding QR code 402 generated directly within the web browser 120-1 in the manner disclosed herein. The QR code 402 illustratively encodes information characterizing a domain and possibly one or more cookies associated with a URL presented on a URL bar 410 of the web browser 120-1. This is an example of an arrangement in which a QR code characterizing a URL of a website is generated directly within a browser, without the use of a plug-in, in an illustrative embodiment.

In either of the examples of FIGS. 3 and 4, a user can easily and efficiently shift their browsing of the example web page from the first user device 102-1 to the second user device 102-2 by utilizing the mobile application 124 on the second user device 102-2 to scan the QR code 302 or 402 presented on the display 122-1 of the first user device. The mobile application 124 operates in conjunction with the web browser 120-2 to process information encoded in the scanned QR code 302 or 402 in order to determine the domain and possibly one or more cookies associated with the corresponding URL presented in URL bar 310 or 410, and to cause the same web page to be automatically presented on the display 122-2 of the second user device 102-2.

For example, assume a user is browsing from his or her desktop computer for purchase options for a Dell laptop on a Dell.com website and reaches one of the example web pages shown in the screenshot 300 or 400. Further assume that the user for any of a number of different reasons needs to leave the desktop computer, but would like to preserve the browsing session and access to the corresponding web page on his or her mobile device, which is an example of second user device 102-2. The user can activate the mobile application 124 to scan the presented QR code 302 or 402 in order to access the same web page via the mobile device, without the tedious chore of manually entering the complex URL presented in the URL bar 310 or 410 into the web browser 120-2 of the mobile device.

In the FIG. 3 embodiment, the QR code 302 encoding information associated with the URL in URL bar 310 is illustratively presented on the display 122-1 of the first user device 102-1 responsive to user activation of an icon corresponding to the new plug-in 305. This activatable icon is denoted by the letter T in the figure, and activation thereof causes the new plug-in 305 to generate the QR code 302 for the URL in URL bar 310.

Similarly, in the FIG. 4 embodiment, the QR code 402 encoding information associated with the URL in URL bar 410 is illustratively presented on the display 122-1 of the first user device 102-1 responsive to navigation to that URL via the web browser 120-1. Accordingly, the web browser 120-1 in this embodiment directly and automatically generates the QR code 402 for the URL in URL bar 410.

Additional or alternative techniques can be used to generate QR codes for respective URLs in the web browser 120-1 of the first user device 102-1.

Illustrative embodiments disclosed herein advantageously allow a user to click on or otherwise activate an icon or other similar element in a web browser, on demand, which once activated will cause a QR code to be presented. Alternatively, such QR codes can be generated automatically, or under other conditions.

The user can then scan the presented QR code using another device in order to take the corresponding web page directly into the browser of the new device. Accordingly, a given web page presented in the first user device 102-1 will illustratively have a corresponding QR code presented in conjunction therewith which can be easily scanned and processed on the second user device 102-2 in order to instruct the web browser 120-2 of the second user device 102-2 to open that same web page.

Illustrative embodiments of this disclosure address at least the following example types of websites, although additional or alternative website types may be used:

1. Websites that allow a user to open a "middle" or other internal page of the site (e.g., an internal web page that the user reached by navigating through multiple other web pages in the browser of the first device) in a browser of a second device, without authentication. This includes many e-commerce sites like dell.com, amazon.com, etc. as well as sites for public blogs and articles. Such websites are also referred to herein as "standard" websites.

2. Cookie-based SSO enabled authenticated sites, such as, for example, console.delltechnologies.com and intranet SSO based sites. Such websites are also referred to herein as "SSO enabled" websites.

3. Websites in which the middle or other internal page is authenticated with a server-side session, in order to validate the personal information of the user. These websites include banking applications and other websites with additional security enabled at the server side. In these applications, illustrative embodiments may be configured to redirect to the login page, where the user needs to enter the credentials and is then redirected to the targeted web page. Accordingly, for websites in this category, before the user navigates to the targeted page, the user is required to enter credentials. Such websites may be viewed as examples of what are more generally referred to herein as "authenticated" websites.

As indicated previously, conventional approaches suffer from significant drawbacks.

Illustrative embodiments disclosed herein overcome these and other problems of conventional practice by enabling a user to navigate to any page in a given website using web browser 120-1 of first user device 102-1, and then to shift the current web page into the web browser 120-2 of the second user device 102-2, by simply utilizing the second user device 102-2 to scan a QR code presented on the first user device 102-1.

In some embodiments, activating an icon or other element in the web browser 120-1 to generate a QR code illustratively opens a popup, which will allow a user to select from a number of options, illustratively including at least a subset of the following, although additional or alternative options are possible:

1. Standard
2. SSO Enabled
3. Show Me More

Once the user makes a selection according to the nature of the website, the popup will show a QR code, that represents the current page URL and at least one cookie if an SSO enabled website is selected.

If the user selects Standard, the user can open a standard QR code scanner or the mobile application 124 in the second user device 102-2 to scan the QR code in the second user device 102-2, which allows the user to shift the page to the second user device 102-2.

If the user selects SSO Enabled, the user opens the mobile application 124 and scans the QR code. This will allow the web page and its one or more associated cookies to be shifted from the web browser 120-1 of the first user device 102-1 into the web browser 120-2 of the second user device 102-2.

Example implementations of the Show Me More functionality are described in more detail below in conjunction with FIGS. 9 through 12.

In other embodiments, such user selection is not implemented, and the web browser 120-1 instead automatically determines the type of website.

As indicated previously, in some embodiments, a new browser plug-in is provided that generates the QR code for the browser. This plug-in illustratively has at least the following two options:

1. Standard (for non-authenticated websites)
2. SSO Enabled (for those websites which have cookie based SSO enabled)

Standard Websites

If the user selects Standard, the browser plug-in will read the current URL that is presented in the URL bar of the browser and generate a QR code based on the current URL. The user can use the mobile application or a standard QR code scanner in a mobile device for opening the corresponding web page.

SSO Enabled Websites

If the user selects SSO Enabled, the plug-in will:

1. Read current URL that is presented in the URL bar of the browser.
2. Parse the domain name and read cookies for that domain that are set in that browser (e.g., can use a standard java script to read the cookie from that browser).
3. Convert the current URL, and cookies under that domain into a standard format, such as a JSON file. A JSON file is a file that stores simple data structures and objects in a standard data interchange format.

Again, user selection is not required, and other embodiments can be configured to automatically determine the type of website.

In some embodiments, a mobile application is configured to read the QR code for the cookie based SSO enabled websites.

If the user selects SSO Enabled, the user scans the generated QR code using the mobile application in the mobile device.

The mobile application is illustratively configured to perform the following operations, although additional or alternative operations can be performed in other embodiments:

1. Read QR code and get the content.
2. If content is standard URL (e.g., starts with "http"), open the URL in the browser (standard website).
3. If content is not standard URL (e.g., SSO enabled), read content as JSON format:
   (a) Read the current URL and cookies from JSON file;
   (b) Open the browser in the device;
   (c) Run script to set cookie in that browser; and
   (d) Open the current URL.

User Experience

When the user wants to shift the page to another device (e.g., from desktop browser to mobile browser):

1. User clicks on the browser plug-in.
2. This will open a popup, where user selects Standard or SSO Enabled. Again, such user selection can be replaced with an automatic determination by the web browser.
3. On submission of the selection, a QR code will be shown.
4. If the user selected Standard, the user opens either the standard QR code scanner in the mobile device, or the disclosed mobile application.
5. User scans the QR code, and the page of the website in the first device will open in the second device browser.
6. If server-side authentication is enabled in the website, the second device browser will redirect to a login page. Once credentials are entered, the user will be redirected to the targeted page. If not redirected, the user can use the second device to rescan the QR code generated in the first device once authenticated and corresponding server session will be maintained in the browser of the second device.

As noted above, in some embodiments, the QR code is generated using a browser plug-in. However, in other embodiments, a commerce site like Dell.com is configured to enable the generation of QR codes directly in the browser. For example, the browser can generate a QR code in the manner illustrated in FIG. 4.

Additional implementation details of illustrative embodiments will now be described with reference to the software code examples of FIGS. 5 through 8.

In some embodiments, an example implementation includes the following components:

1. Browser plug-in for generating QR codes.
2. Mobile application supporting SSO enabled websites and other website types.

It will be assumed for this example implementation that the web browser 120-1 is a Google Chrome browser, although similar techniques can be used for other types of web browsers.

FIG. 5 shows an example of a manifest for the browser plug-in.

FIG. 6 shows example HTML code configured to generate a popup of the type mentioned previously, upon activation of the browser plug-in icon.

Figure 7:
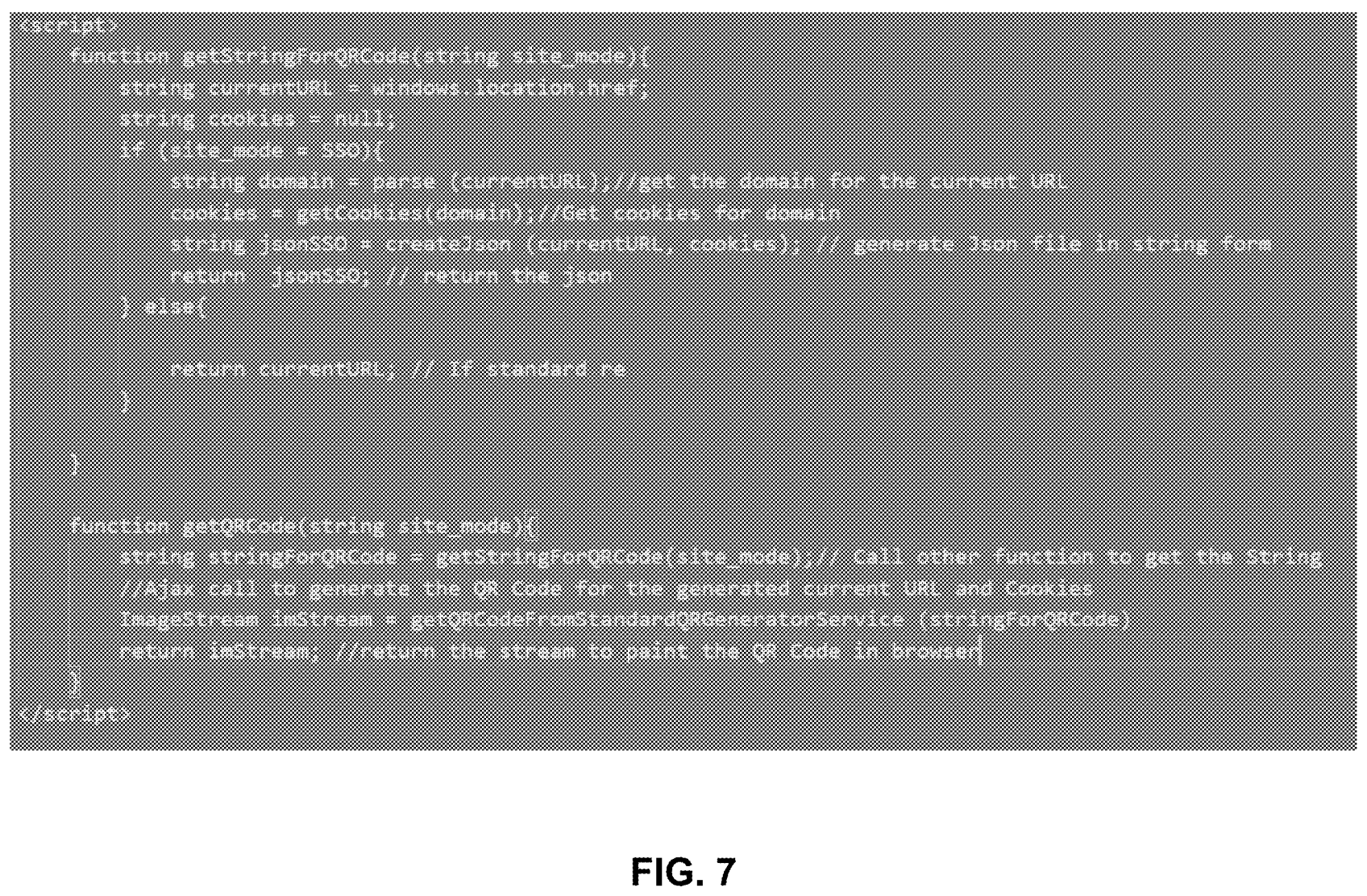

FIG. 7 shows example Java script pseudocode for generating a QR Code in the browser plug-in.

In accordance with the example pseudocode of FIG. 7, if a user selects Standard, the plug-in generates a QR Code that represents the URL of the current page.

If the user selects SSO Enabled, the plug-in generates a QR code that represents the URL via a JSON file that includes information characterizing the domain and one or more cookies currently set in the browser for that domain.

FIGS. 8A and 8B show examples of JSON files generated for web pages of SSO enabled websites using the techniques disclosed herein.

Again, although these examples include user selection of website type, that function can be performed automatically without user input in other embodiments.

For standard websites, a standard QR code scanner of the second user device 102-2 can be used, in place of the mobile application 124, although the mobile application 124 is illustratively configured to scan QR codes generated for respective web pages of multiple distinct website types.

For SSO enabled websites, the mobile application 124 illustratively reads the QR code and obtains the JSON file representation which it uses to determine the domain and one or more cookies associated with the URL.

This process in some embodiments is performed using the following example algorithm implemented by the mobile application 124:

1. Scan the QR code from display 122-1 of the first user device 102-1.
2. Get the content of the scanned QR code.
3. If content starts with "http," then open the content directly in the web browser 120-2 of the second user device 102-2.
4. If content doesn't start with "http," then read it as a JSON file.
5. Read current URL from "currentURL" tag.
6. Read domain from "domain" tag.
7. Read collection of one or more cookies from "cookievalues."
8. Open the web browser 120-2 in the second user device 102-2.
9. Run the script below in the web browser 120-2 to set the cookies.

```
<script>
    document.cookie="cookie string"; // sets cookie
    windows. location.href="currentURL"
</script>
```

Once the cookie header, values and path are set in the browser, the current URL is opened in the browser.

For any web pages for which one or more cookies are set, the mobile application 124 will read those cookies and enable the SSO to open the web page.

Another example arrangement of the first user device 102-1 of the FIG. 1 system will now be described.

In some embodiments, to address situations in which a given user may not be able to determine whether the website is a standard website or an SSO enabled website, the first user device 102-1 is configured to provide the user with an option to select "don't know" and/or to allow the user to make no selection. In such cases, the first user device 102-1 will prepare the QR Code for a web page of an SSO enabled website by reading the cookie for that domain. In other words, this embodiment will operate as if the user had selected an SSO enabled website option. If there is no cookie in the JSON file, the mobile application 124 will simply treat the web page as being from a standard website.

Such an embodiment illustratively utilizes the following example algorithm, although additional or alternative steps could be used:

1. User clicks on browser plug-in icon on display 122-1 of first user device 102-1.
2. Browser plug-in will read the current URL and cookie(s) for that domain.
3. Browser plug-in creates a JSON file with encrypted information characterizing the domain and the one or more cookies, illustratively using what is referred to herein as Inter-Device Data Transfer Language (IDDTL). Examples are shown in FIGS. 8A and 8B to be described elsewhere herein.
4. Browser plug-in generates the QR code based on the above IDDTL and presents the generated QR code on the display of the first user device 102-1.
5. Mobile application 124 is opened on second user device 102-2, illustratively a mobile device such as a mobile telephone or a tablet computer.

6. Mobile application 124 reads the QR code to obtain the IDDTL, processes the IDDTL to obtain the current URL and any cookies, including decrypting any encrypted values.
7. Mobile application 124 opens the web browser 120-2, applies any cookies in a session of the web browser, and opens the current URL to effectively complete the shift of the corresponding web page from the first user device 102-1 to the second user device 102-2.

In some embodiments, such an arrangement requires no code changes for existing web applications. All domain and cookie information is illustratively passed from the first user device to the second user device via the IDDTL encoded in the generated QR code, possibly as encrypted values.

Although a browser plug-in is illustratively utilized in the above example algorithm, a similar algorithm can be implemented without a plug-in by incorporating similar functionality in the browser itself.

Additional illustrative embodiments will now be described in conjunction with FIGS. 9 through 12. These embodiments are configured to provide further enhancements in user experience by generating QR codes based at least in part on web page metadata, thereby allowing user access to additional related information, particularly in those situations in which there is a constraint on "real estate" on the corresponding web page.

These embodiments provide an XML based standard metadata language to allow users to view additional information relating to a given web page in another device using an intelligent QR representation, <QRDetails> under <meta> section. This metadata language is illustratively entered by the developer at the time of web page creation, and is an example of what is more generally referred to herein as "web page metadata." For example, the developer can opt to present additional related information for a product, where such additional related information cannot otherwise be shown in the web page due to space constraints. Such additional related information can include, for example, one or more of the following:

1. View Video Demo
2. View Detailed Product
3. View Related Product
4. View Public Rating These are only examples, and additional or alternative options can be provided in other embodiments. This information can be incorporated into a QR code generated in the manner disclosed herein.

In order to support this functionality, the developer illustratively adds the new QR code metadata language in the web page <meta> tag, as shown in FIG. 9.

FIG. 10 shows an example of particular QR language used to provide the above items 1 through 4 of the additional related information.

The user scans the QR code using the mobile application 124, which in the present embodiment is assumed to be configured to understand the <QRDetails> language.

In some embodiments, the following algorithm is utilized, although additional or alternative steps could be used.

1. User browses product page in e-commerce website.
2. User clicks "Show Me More" button.
3. QR code is generated that contains the above-noted metadata language, illustratively a new standard QR code language, containing additional information about the product as defined by the developer of the web page.
4. User scans the QR code using mobile application 124.

5. User views all options in the mobile application 124. See FIG. 12A for an example in which a mobile device 1200 presents a set of options on a display 1202 of the mobile device 1200.

6. User clicks on different options to learn more about the product. Examples are shown in FIGS. 12B and 12C.

7. In some embodiments, the user can check out and pay from the mobile application 124 or re-open the web page the user left and proceed to checkout from that point.

FIGS. 9, 10, 11 and 12 collectively illustrate a particular implementation example, although it should be appreciated that additional or alternative features and functionality can be provided in other embodiments.

Assume that the web page developer wants to provide the previously-noted options for access to additional information relating to a product in the corresponding web page, repeated below:

1. View Video Demo

2. View Detailed Product

3. View Related Product

4. View Public Rating

However, it is further assumed that the web page developer does not have sufficient space ("real estate") in the current web page to present all of these options. Illustrative embodiments herein utilize a generated QR code displayed on the first user device 102-1 and mobile application 124 implemented on the second user device 102-2 to effectively present all of the desired additional information options without utilizing additional space on the web page.

When the user clicks on "Show Me More," as mentioned in conjunction with other embodiments described herein, a script first reads the QR language from the meta tag from that page, and replaces all $xxxx with actual values from the page for that product (e.g., $productId will be replaced with the value from the actual productid that user selected). Similar processing is performed for the cookie values.

Once the variables are replaced, the script generates the QR code with <QRDetails>, as illustrated in FIG. 11.

When the mobile application 124 scans the QR code it will get all the corresponding details. For example, it extracts the <Options> tag and shows all <Option> items under that to the user, as shown in FIG. 12A.

Assume the user selects the option "View Video Demo." The mobile application 124 reads the tag under that option:

<visualDemo            url="dell.com/$product/visualD-emo.mp4"/>

Since the attribute is "url" it calls the corresponding value, resulting in presentation of the corresponding video as illustrated in FIG. 12B.

If the tag that scanner finds is "Resturl" it will call the rest URL given in the value, resulting in the presentation of the corresponding information as illustrated in FIG. 12C.

The mobile application 124 is illustratively configured to save this information and page content locally, so that the user can later open the page and view the associated details even in an offline mode. The user can opt to check out from the mobile application 124. Cookie details are used for personalization when the user returns to the same web page as described previously.

Such embodiments configure the mobile application 124 to provide a scanning function that understands the developer defined <QRDetails> language and shows the different features that the developer defined. The mobile application 124 saves the details so as to enable the user to view the same product later and check out from there or return back to the web page that the user previously left.

It is to be appreciated that the foregoing are only examples, and should not be viewed as limiting the scope of the disclosure in any way.

Illustrative embodiments provide a number of significant advantages relative to conventional arrangements.

For example, one or more such embodiments avoid situations in which a user must manually enter a complex URL or portions thereof from a first user device on which the corresponding web page is currently being viewed into a second user device in order to view that same web page on the second user device.

These and other embodiments allow a user to easily shift a web page of a web site from one device to another device.

Some embodiments are configured to generate a QR code on demand in a web browser, based on the current URL and one or more cookies in that browser, and to make the QR code available for another device to reach the same page directly.

Such arrangements provide significant user benefits in terms of facilitating the shifting of web pages having complex URLs between multiple devices, in a wide variety of different use cases including sales and marketing.

The disclosed techniques are simple to implement in illustrative embodiments, and can be adapted in a straightforward manner for use with a wide variety of different types of browsers and mobile applications.

Illustrative embodiments herein advantageously avoid the need for pairing relationships between devices, and other similar complexities required by conventional approaches such as Apple Handoff.

Some embodiments are configured to provide further enhancements in user experience by generating the QR code based at least in part on web page metadata, thereby allowing user access to additional related information, particularly in those situations in which there is a constraint on "real estate" on the corresponding web page.

These further enhancements are provided in some embodiments without the need for changes to existing web applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement one or more user devices, web servers and/or other system components associated with automated shifting of web pages will now be described in greater detail with reference to FIGS. 13 and 14. Although described in the context of system 100, these platforms may also be used to implement at least portions of other information processing systems in other embodiments.

Figures 13, 14:
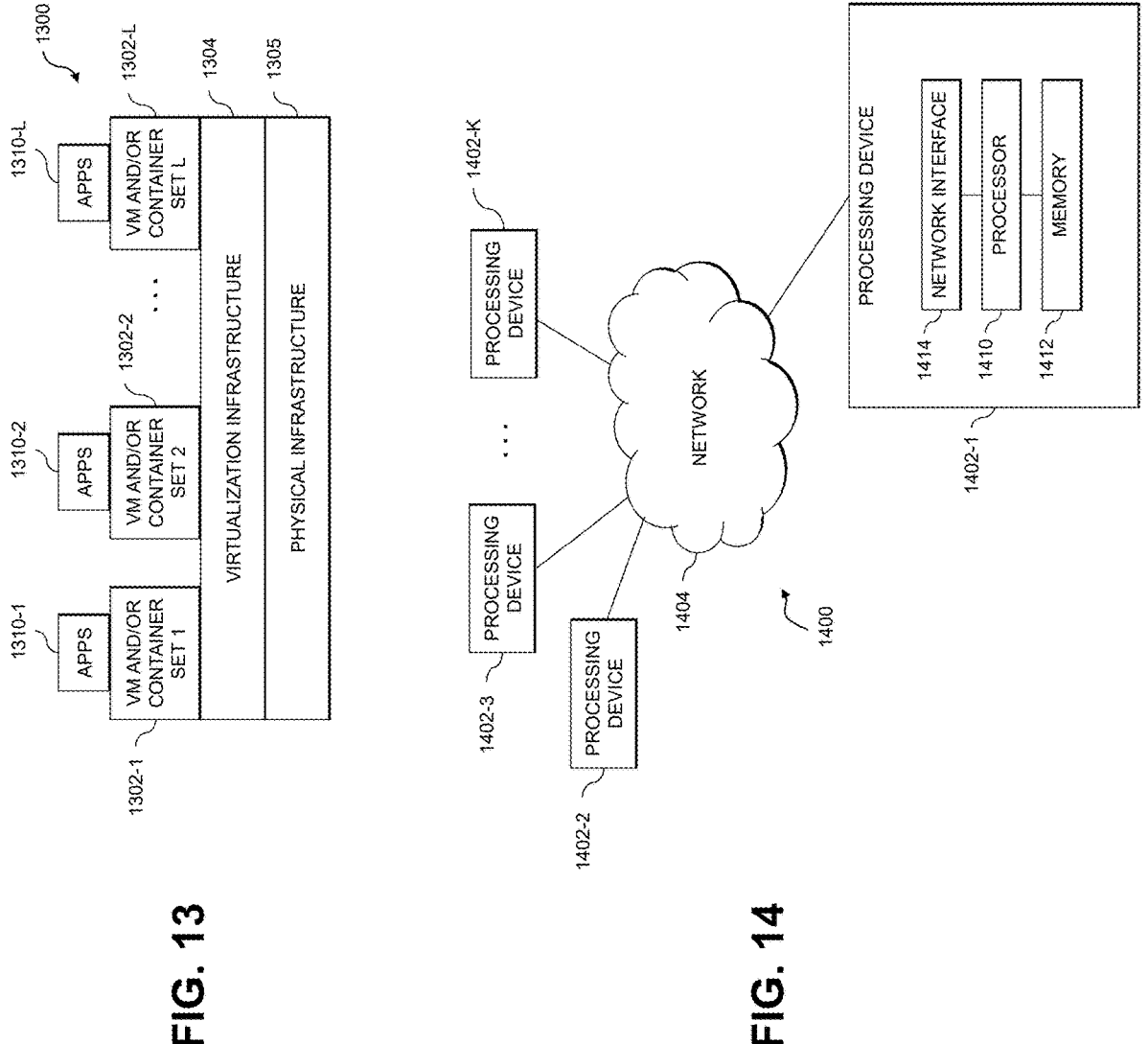
FIGS. 13 and 14 show examples of processing platforms that can be used to implement at least portions of an information processing system in illustrative embodiments.

FIG. 13 shows an example processing platform comprising cloud infrastructure 1300. The cloud infrastructure 1300 comprises a combination of physical and virtual processing resources that may be utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. Such implementations can provide functionality of the type disclosed herein using one or more processes running on a given one of the VMs. For example, each of the VMs can implement logic instances, data structures and/or other components for implementing functionality associated with automated shifting of web pages in the system 100.

A hypervisor platform may be used to implement a hypervisor within the virtualization infrastructure 1304. Such a hypervisor platform may comprise an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system. Such implementations can also provide functionality of the type described above. For example, a container host device supporting multiple containers of one or more container sets can implement logic instances, data structures and/or other components for implementing functionality associated with automated shifting of web pages in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network such as a 4G or 5G cellular network, a wireless network such as a WiFi, WiMAX or Bluetooth network, or various portions or combinations of these and other types of networks.

The processing device 1402-1 in the processing platform 1400 comprises a processor 1410 coupled to a memory 1412.

The processor 1410 may comprise a microprocessor, a CPU, a GPU, a microcontroller, an ASIC, an FPGA or other type of processing circuitry, as well as portions or combinations of such circuitry elements.

The memory 1412 may comprise RAM, ROM, flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure, including hyper-converged infrastructure (HCI).

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the automated web page shifting functionality provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, user devices, web servers, web browsers, browser plug-ins, applications and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain at least a portion of a uniform resource locator (URL) presented in a browser;

to determine at least one of a domain and one or more cookies associated with the URL;

to generate a file comprising information characterizing the at least one of the domain and the one or more cookies associated with the URL;

to generate a multi-dimensional code based at least in part on the generated file; and to present the multi-dimensional code via the browser for scanning;

wherein the at least one processing device is further configured to determine in the browser a website type for the URL presented in the browser from a plurality of distinct website types, the determined website type being a website type for a particular website identified by the URL, the determining of the website type for the URL thereby being performed in the same browser that presents the URL and presents the multi-dimensional code; and wherein generating the file comprising information characterizing the at least one of the domain and the one or more cookies associated with the URL comprises:

responsive to the determined website type being a first website type of the plurality of distinct website types, generating the file utilizing a first set of information characterizing the at least one of the domain and the one or more cookies; and responsive to the determined website type being a second website type of the plurality of distinct website types, the second website type being different than the first website type, generating the file utilizing a second set of information characterizing the at least one of the domain and the one or more cookies, the second set of information being different than the first set of information.

2. The apparatus of claim 1 wherein obtaining at least a portion of the URL presented in the browser comprises reading at least a portion of the URL from a URL bar of the browser.

3. The apparatus of claim 1 wherein generating the file comprises generating the file in a JavaScript Object Notation (JSON) format that incorporates information characterizing the domain and the one or more cookies associated with the URL.

4. The apparatus of claim 1 wherein the multi-dimensional code comprises a two-dimensional quick response (QR) code.

5. The apparatus of claim 1 wherein the obtaining, determining, generating the file, generating the multi-dimensional code and presenting the multi-dimensional code are performed at least in part by a plug-in of the browser.

6. The apparatus of claim 5 wherein the browser plug-in is implemented on a first user device and the multi-dimensional code presented via the browser for scanning is presented for scanning by a second user device different than the first user device.

7. The apparatus of claim 1 wherein the plurality of distinct website types includes at least a standard website type for a non-authenticated website and a single sign-on (SSO) enabled website type for an authenticated website.

8. The apparatus of claim 7 wherein responsive to determining that the website type for the URL is a standard website type for a non-authenticated website, determining the domain associated with the URL and generating the file based at least in part on the determined domain.

9. The apparatus of claim 7 wherein responsive to determining that the website type for the URL is an SSO enabled website type for an authenticated website, determining the domain and one or more cookies associated with the URL, and generating the file based at least in part on the domain and the one or more cookies associated with the URL.

10. The apparatus of claim 1 wherein determining the website type for the URL is performed based at least in part on user input.

11. The apparatus of claim 1 wherein determining the website type for the URL is performed automatically without requiring user input.

12. The apparatus of claim 1 wherein presenting the multi-dimensional code via the browser for scanning comprises presenting the multi-dimensional code for scanning by a mobile application of a mobile device of a user.

13. The apparatus of claim 12 wherein the mobile application is configured:

to read the multi-dimensional code;

to determine the website type for the URL from the plurality of distinct website types including at least a standard website type for a non-authenticated website and a single sign-on (SSO) enabled website type for an authenticated website;

responsive to the website type being a standard website type for a non-authenticated website, opening the URL in a browser of the mobile device; and responsive to the website type being an SSO enabled website type for an authenticated website, setting the one or more cookies associated with the URL in the browser of the mobile device, and opening the URL in the browser of the mobile device.

14. The apparatus of claim 1 wherein generating the multi-dimensional code based at least in part on the generated file comprises generating the multi-dimensional code to include web page metadata defining one or more options for accessing additional information relating to a web page identified by the URL.

15. A computer program product comprising a non-transitory processor-readable storage medium having stored therein program code of one or more software programs, wherein the program code when executed by at least one processing device causes said at least one processing device:

to obtain at least a portion of a uniform resource locator (URL) presented in a browser;

to determine at least one of a domain and one or more cookies associated with the URL;

to generate a file comprising information characterizing the at least one of the domain and the one or more cookies associated with the URL;

to generate a multi-dimensional code based at least in part on the generated file; and to present the multi-dimensional code via the browser for scanning;

wherein the program code when executed further causes said at least one processing device to determine in the browser a website type for the URL presented in the browser from a plurality of distinct website types, the determined website type being a website type for a particular website identified by the URL, the determining of the website type for the URL thereby being performed in the same browser that presents the URL and presents the multi-dimensional code; and wherein generating the file comprising information characterizing the at least one of the domain and the one or more cookies associated with the URL comprises:

responsive to the determined website type being a first website type of the plurality of distinct website types, generating the file utilizing a first set of information characterizing the at least one of the domain and the one or more cookies; and responsive to the determined website type being a second website type of the plurality of distinct website types, the second website type being different than the first website type, generating the file utilizing a second set of information characterizing the at least one of the domain and the one or more cookies, the second set of information being different than the first set of information.

16. The computer program product of claim 15 wherein the plurality of distinct website types includes at least a standard website type for a non-authenticated website and a single sign-on (SSO) enabled website type for an authenticated website.

17. The computer program product of claim 16 where responsive to determining that the website type for the URL is an SSO enabled website type for an authenticated website, determining the domain and one or more cookies associated with the URL, and generating the file based at least in part on the domain and the one or more cookies associated with the URL.

\* \* \* \* \*